(No Model.)

C. B. BOYLE.
COMBINED REFLECTOR AND REFRACTING LENS.

No. 308,870. Patented Dec. 9, 1884.

Attest:
L. M. Hopkins.
Wm. G. Sayers.

Inventor:
Charles B. Boyle,
By Knight Bros
Attorneys.

UNITED STATES PATENT OFFICE.

CHARLES B. BOYLE, OF NEW YORK, N. Y.

COMBINED REFLECTOR AND REFRACTING LENS.

SPECIFICATION forming part of Letters Patent No. 308,870, dated December 9, 1884.

Application filed August 18, 1882. Renewed August 23, 1883. (No model.)

*To all whom it may concern:*

Be it known that I, CHARLES B. BOYLE, a citizen of the United States, residing in the city, county, and State of New York, have invented a new and useful Combination of Reflectors and Refractors, (for which I have not yet applied for patents in any foreign country,) and of which the following is a specification.

My invention relates to locomotive headlights, light-house illuminators casting beams of light out to sea for coast-defense purposes, lighting the path of ships, &c.

The object of my instrument is to concentrate all or nearly all the rays of light radiated from any given burner into a single beam of parallel or nearly parallel light, thereby obtaining the greatest degree of brilliancy upon whatever object the beam is directed.

The accompanying drawings illustrate the construction of the instrument referred to.

Figure 1:
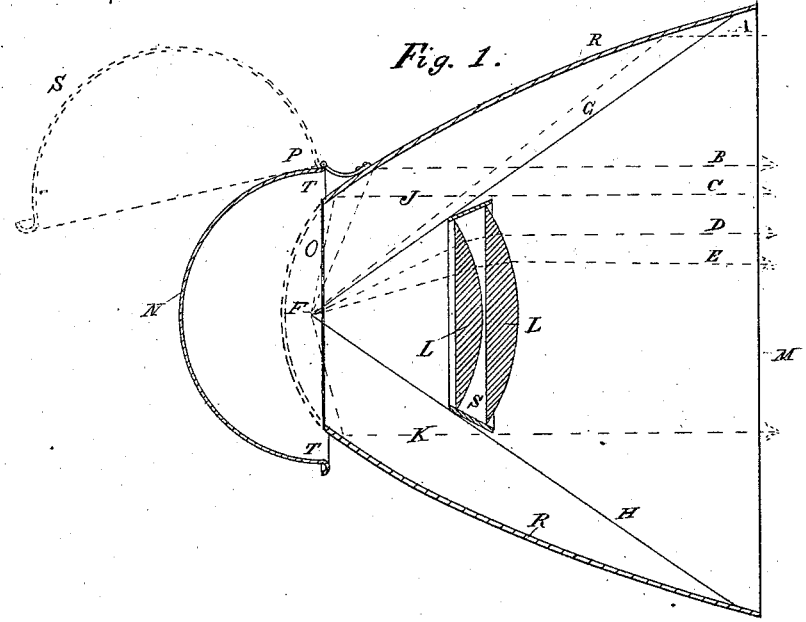
Figure 2:
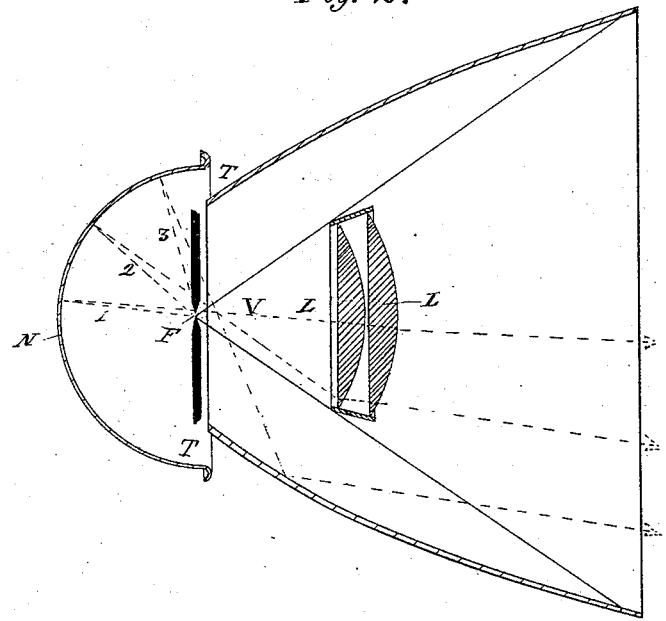

Figure 1 is a horizontal central section of my improved instrument. Fig. 2 is a vertical central section of the same, showing the carbon-points of an arc light in place therein.

R R represent the curved sides of a paraboloid reflector, and M its mouth or greatest opening. The combined lenses L L are posed concentrically in the parabolic reflector, and at such a point in its optical axis as will place the flame in the combined focus of the lenses, and as the flame is also in the focus of the parabolic reflector the result obtained is that light radiated from the point F (the position of the flame) is refracted by the combination of lenses and reflected by the parabolic reflecting-surface into a sheaf of parallel rays, as shown by the dotted lines A B C D E. The black lines G H proceeding from the position of the flame F to a point inside the mouth of the reflector and the edge of the interior lens show that the focal length of the lens combination is so computed that while the flame F is in its focus it occupies a position that prevents the escape of any of the radiating light which otherwise would escape as diverging light out of the mouth of the reflector. It may also be noticed that the extreme widths of the cell containing the lenses is the same as the back opening, O, of the parabolic reflector, consequently it intercepts none of the reflected light, as shown by the dotted lines J and K. It will be seen that were the paraboloid reflector intact, having a refracting-surface back as well as forward of the flame, all rays of light falling upon the portion back of the flame would be reflected thence in lines parallel or otherwise, according to the degree of curve of the reflector, but on entering the lens would be refracted thereby and would issue from the reflector with an angle of divergence proportionate to the curvature of the lens. To avoid this difficulty and utilize the backward as well as the forward rays of light as part of the beam of light cast by the reflector is the object of the present invention. To this end I remove a section of the back of the reflector of a diameter equal to that of the outer lens L, and to intercept and cast back the rays of light passing through the aperture thus formed I employ a hemispherical reflector, N, which is hinged onto the parabolic reflector at the point P, and the curved dotted line S represents its swing upon that hinge. This spherical reflector is made wider in diameter than the back opening of the paraboloid reflector, in order to leave an open annular space, T T, between them for the purpose of obtaining a free circulation of air. One of the objects of this mode of construction is to obtain greater distance from the luminous point for the metallic reflecting-surfaces, so that their heating may be reduced to a minimum; but the chief object of this portion of the instrument I shall now explain, illustrating the same by reference to Fig. 2. The geometrical center of the cap N is arranged slightly in advance of the illuminating-point F. Thus the rays represented by dotted lines 1 2 3 radiated from the flame F, after impinging on the surface N of the hemispherical reflector, are reflected through the optical axis V at some distance in front of the light, in order to avoid their interception by a lamp or carbon point. Two of those rays are shown falling upon the lenses L L, and one upon the reflector R, and their continuation shown by the arrow-headed dotted lines express their small amount of divergence from coincidence in direction with the rays shown in Fig. 1.

The combination of two lenses, as shown in both figures, is a necessity of this invention, because the focus required is so short that a single lens to obtain it would have to be double convex, and a large portion of the radiated light would impinge upon the inner convex surface at angles greater than that of total reflection, and, therefore, would not pass through the lens, but would be reflected from its inner surface, scattered, and lost.

I am aware that lenses and parabolic reflectors have previously been used in combinations resembling in general appearance the instrument here presented, provided that the parabolic reflector R R, Fig. 1, were continued about the radiant point F, as shown by the dotted curved line which joins the two sides R R of the reflector and the lens were a single one; but a lens so posed in a paraboloid reflector, while it condenses the rays directly radiated from the source of light F, scatters to a like extent those reflected onto it from the back end of the paraboloid; hence they condense no more light than the reflector would do alone were the lens removed from it. Therefore I do not claim a paraboloid reflector with a lens posed inside of it or on its front.

I have shown and claimed in my application No. 104,555 the herein-described system of double lenses applied to a light-house illuminator having two or more paraboloid reflectors mitered or otherwise joined together, and do not herein claim such an arrangement.

What I do claim, and desire to secure by Letters Patent, is—

1. The combination of paraboloid reflector R, cut away at back, as shown, curved reflector N, arranged to intercept and return backward rays, and a plurality of lenses, L, so arranged concentrically within said paraboloid reflector as to intercept all rays which would directly pass beyond the edges of the reflector, substantially as and for the purpose set forth.

2. The combination of paraboloid reflector R, having back opening, as shown, a plurality of lenses, L, posed therein so as to intercept all forward rays not impinging on the reflector R, and curved reflector N, of a greater diameter than said opening, and arranged without said opening in such relation to the flame as to reflect a portion of its radiant light back through a point upon the optical axis near to but forward of the position of the flame, substantially as and for the purposes set forth.

CHAS. B. BOYLE.

Witnesses:
JOSEPH LEDERLE,
L. HERBRUF.